(12) United States Patent
Tatsumi

(10) Patent No.: US 10,723,180 B2
(45) Date of Patent: Jul. 28, 2020

(54) PNEUMATIC TIRE

(71) Applicant: SUMITOMO RUBBER INDUSTRIES, LTD., Kobe-shi, Hyogo (JP)

(72) Inventor: Hiroyuki Tatsumi, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 815 days.

(21) Appl. No.: 15/031,794

(22) PCT Filed: Jan. 6, 2015

(86) PCT No.: PCT/JP2015/050105
§ 371 (c)(1),
(2) Date: Apr. 25, 2016

(87) PCT Pub. No.: WO2015/105087
PCT Pub. Date: Jul. 16, 2015

(65) Prior Publication Data
US 2016/0243901 A1    Aug. 25, 2016

(30) Foreign Application Priority Data

Jan. 10, 2014 (JP) ................. 2014-002851

(51) Int. Cl.
*B60C 15/04* (2006.01)
*B60C 15/02* (2006.01)
*B60C 15/024* (2006.01)

(52) U.S. Cl.
CPC ............. *B60C 15/04* (2013.01); *B60C 15/02* (2013.01); *B60C 15/024* (2013.01); *B60C 2015/048* (2013.01); *B60C 2200/06* (2013.01)

(58) Field of Classification Search
CPC ....... B60C 15/02; B60C 15/024; B60C 15/04; B60C 15/00; B60C 2015/048
(Continued)

(56) References Cited

U.S. PATENT DOCUMENTS

| 4,216,814 A * | 8/1980 | Grosch | .................. B60C 15/04 152/540 |
| 2013/0186542 A1 | 7/2013 | Aoki | |
| 2015/0075691 A1* | 3/2015 | Merino Lopez | ........ B60C 15/04 |

FOREIGN PATENT DOCUMENTS

| EP | 1 066 993 A2 | 1/2001 |
| EP | 1911607 A1 | 4/2008 |

(Continued)

OTHER PUBLICATIONS

English translation of International Preliminary Report on Patentability and Written Opinion dated Jul. 12, 2016, in PCT International Application No. PCT/JP2015/050105.

(Continued)

*Primary Examiner* — Adrienne C. Johnstone
(74) *Attorney, Agent, or Firm* — Birch, Stewart, Kolasch & Birch, LLP

(57) ABSTRACT

In a tire, in a cross-section of a core of a bead taken at a plane perpendicular to the circumferential direction, two or more rows of wire cross-sections aligned in the axial direction are stacked. When the radially innermost row is a first row and a row immediately outside the innermost row in the radial direction is a second row, the number of the cross-sections of the wire in the first row is less than that in the second row. An inner end of the second row is axially inward of a line drawn from an inner end of the first row and is perpendicular to a direction in which the first row extends. In the cross-section of the core taken at a plane perpendicular to the (Continued)

circumferential direction, an angle between a bottom side of the core and a bead base line is 2° to not greater than 9°.

7 Claims, 6 Drawing Sheets

(58) Field of Classification Search
USPC .................................................. 152/540, 544
See application file for complete search history.

(56) References Cited

FOREIGN PATENT DOCUMENTS

| | | |
|---|---|---|
| EP | 2599646 A1 | 6/2013 |
| JP | 2001-010311 A | 1/2001 |
| JP | 2001-206027 A | 7/2001 |
| JP | 2003-063217 A | 3/2003 |
| JP | 2003-072325 A | 3/2003 |
| JP | 2004-058823 A | 2/2004 |
| JP | 2007-045375 A | 2/2007 |
| JP | 55-087605 A | 8/2013 |
| JP | 2013-151198 A | 8/2013 |
| WO | WO-2013/150024 A1 * | 10/2013 |

OTHER PUBLICATIONS

International Search Report issued in PCT/JP2015/050105 dated Apr. 7, 2015.
Written Opinion of the International Searching Authority issued in PCT/JP2015/050105 dated Apr. 7, 2015.

* cited by examiner (Prior Art)

PNEUMATIC TIRE

TECHNICAL FIELD

The present invention relates to pneumatic tires.

BACKGROUND ART

A vehicle wheel includes a tire and a rim. The tire is mounted on the rim by the beads of the tire fitting onto the rim. Close contact between the beads and the rim allows hermetic seal. The fitting of the beads onto the rim is very significant for the wheel.

The rim is fastened by the beads fitted on the rim. The tire is fixed to the rim by the fastening force. When a vehicle is quickly accelerated or decelerated, a great force is generated in the circumferential direction between the rim and the bead. If the fastening force of the bead is insufficient, the rim may slip on the bead, which is called "rim slip." If rim slip occurs, the transmission of a force from the vehicle body to the road surface or from the road surface to the vehicle body is inhibited. This leads to decrease in steering stability. Further, rim slip may cause mass balance of the tire to be reduced. This leads to vibration of the vehicle during traveling. Moreover, the insufficient fastening force of the bead may cause separation of the bead from the rim when the vehicle turns, and this may cause "separation from rim".

If the bead is designed to have a great fastening force, rim slip and separation from rim can be reduced. However, if the bead has great fastening force, it is necessary to exert a high fitting pressure in order to fit the beads onto the rim. Time and effort are required to mount such a tire onto the rim. For such a tire, the bead may be locally twisted due to an influence of the high fitting pressure. The twisting may lead to imperfect fitting.

JP2013-151198 discloses a tire in which the fitting pressure is reduced while the fastening force of the beads is maintained. In this tire, the core of the bead includes two kinds of bead wires having different elongations.

CITATION LIST

Patent Literature

Patent Literature 1: JP2013-151198

SUMMARY OF THE INVENTION

Problems to be Solved by the Invention

The fastening force of the bead is measured using a Hofmann fastening force testing machine. This testing machine includes eight segments, a device for moving the segments, a linear potentiometer for measuring the position of each segment, and a load cell. Each segment has an arc shape. The eight segments are disposed, and the segments thus form a ring shape. The segments are disposed so that the outer diameter of the ring is smaller than a rim standard value by a predetermined value. The tire is disposed so that the bottom of each bead is located on the outer sides of the segments. The eight segments are moved gradually in the radial direction. This movement increases the outer diameter of the ring. As the segments move, a load is applied on each segment. The load is measured using the load cell. The load corresponds to the fastening force of the bead. When the outer diameter of the ring becomes larger than the rim standard value by a predetermined value, the measurement is ended.

FIG. 6 shows an exemplary ring outer diameter-fastening force curve obtained by the measurement using the Hofmann fastening force testing machine. The change rate of the fastening force with respect to a change of the ring outer diameter which is in the range of −0.4 mm to +0.4 mm from the rim standard value, is referred to as the "fastening force gradient" of the bead. In FIG. 6, the fastening force gradient is the slope of a straight line connecting between a point A and a point B. For the bead having a large fastening force gradient, change of the fastening force with respect to a change of the rim diameter is great. For the bead having a small fastening force gradient, change of the fastening force with respect to a change of the rim diameter is small.

The fastening force of the bead is typically adjusted to an appropriate value for rims having a rim diameter specified by the standard. However, actually, the rim diameter varies due to error in production. The JATMA standards specify that the variations are ±0.38 mm. When the bead is fitted on a rim having a larger rim diameter than the standard value, the fastening force of the bead deviates from the appropriate value to a larger value. When the bead has a greater fastening force gradient, the deviation from the appropriate value is greater than the deviation in the case of the bead having a smaller fastening force gradient. This causes an increase in the fitting pressure. Time and effort are required to mount this tire to a wheel having this rim. This tire may burst during fitting.

Meanwhile, when the bead is fitted on a rim having a smaller rim diameter than the standard value, the fastening force of the bead deviates from the appropriate value to a smaller value. When the bead has a large fastening force gradient, the deviation from the appropriate value is greater than the deviation in the case of the bead having a small fastening force gradient. This may cause an insufficient fastening force of the bead. This may lead to rim slip or separation from bead.

In order to prevent rim slip and separation from rim and assure easy fitting for rims having a rim diameter that deviates from the standard value, it is important to reduce the fastening force gradient of the bead. A bead having a reduced fastening force gradient has not been studied before.

An object of the present invention is to provide a pneumatic tire that allows prevention of rim slip and separation from rim and achievement of easy fitting.

Solution to the Problems

A pneumatic tire according to the present invention includes: a tread having an outer surface that forms a tread surface; a pair of sidewalls that extend almost inward from ends, respectively, of the tread in a radial direction; a pair of beads disposed inward of the sidewalls, respectively, in the radial direction; and a carcass that is extended on and between one of the beads and the other of the beads along inner sides of the tread and the sidewalls. Each bead includes a core. The core includes a non-stretchable wire wound in a circumferential direction. In a cross-section of the core taken at a plane perpendicular to the circumferential direction, two or more rows of cross-sections of the wire aligned almost in an axial direction are stacked. When, of the rows, a radially innermost row is a first row, and a row immediately outside the innermost row in the radial direction is a second row, the number of cross-sections of the wire in the first row is less than the number of cross-sections of the wire in the second row. An inner end of the second row is located axially inward of a line that is drawn from an inner end of the first row and that is perpendicular to a direction in which the first row extends. In the cross-section of the core taken at a plane perpendicular to the circumferential direction, an angle between a bottom side of the core and a bead base line is greater than or equal to 2°, and not greater than 9°. When of the cross-sections of the wire in the second row, an axially innermost cross-section is a reference cross-section, VL represents a tangent drawn from an axially inner end of the reference cross-section and extending in the radial direction, P1 represents an intersection point between the tangent VL and a radially inner surface of the carcass, and P2 represents an intersection point between the tangent VL and a bottom of a bead portion, a distance T between the intersection point P1 and the intersection point P2 is greater than or equal to 3.1 mm, and not greater than 4.0 mm.

Preferably, in the cross-section of the core taken at a plane perpendicular to the circumferential direction, three or more of the rows are stacked. Of the three or more rows, the number of cross-sections of the wire in a radially outermost row is less than the number of cross-sections in a row immediately inside the outermost row in the radial direction.

Preferably, the total of the areas of all the cross-sections of the wire included in the cross-section of the core is greater than or equal to 13.6 mm$^2$, and not greater than 18.1 mm$^2$.

Preferably, the cross-section of the core has an octagonal outer shape.

Preferably, each cross-section of the wire is in the shape of an ellipse elongated almost in the axial direction.

Preferably, when r1 represents a major axis of the ellipse, and r2 represents a minor axis of the ellipse, a flattening (r2/r1) of the ellipse is greater than or equal to 0.6, and not greater than 0.8.

Advantageous Effects of the Invention

The inventors of the present invention have studied the shape of the bead in order to reduce the fastening force gradient of the bead. As a result, the inventors of the present invention have found that, by providing an appropriate arrangement of cross-sections of the wire aligned in a cross-section of the core, an appropriate angle between the bottom side of the core and the base line, an appropriate distance between the bottom side of the core and the bottom of the bead, the performance for preventing separation from rim is improved and the fitting pressure is reduced, and at the same time, the bead fastening force gradient can be reduced. The pneumatic tire according to the present invention allows prevention of rim slip and separation from rim, and achievement of easy fitting, also for a rim having a rim diameter that deviates from the standard value.

Figure 5:
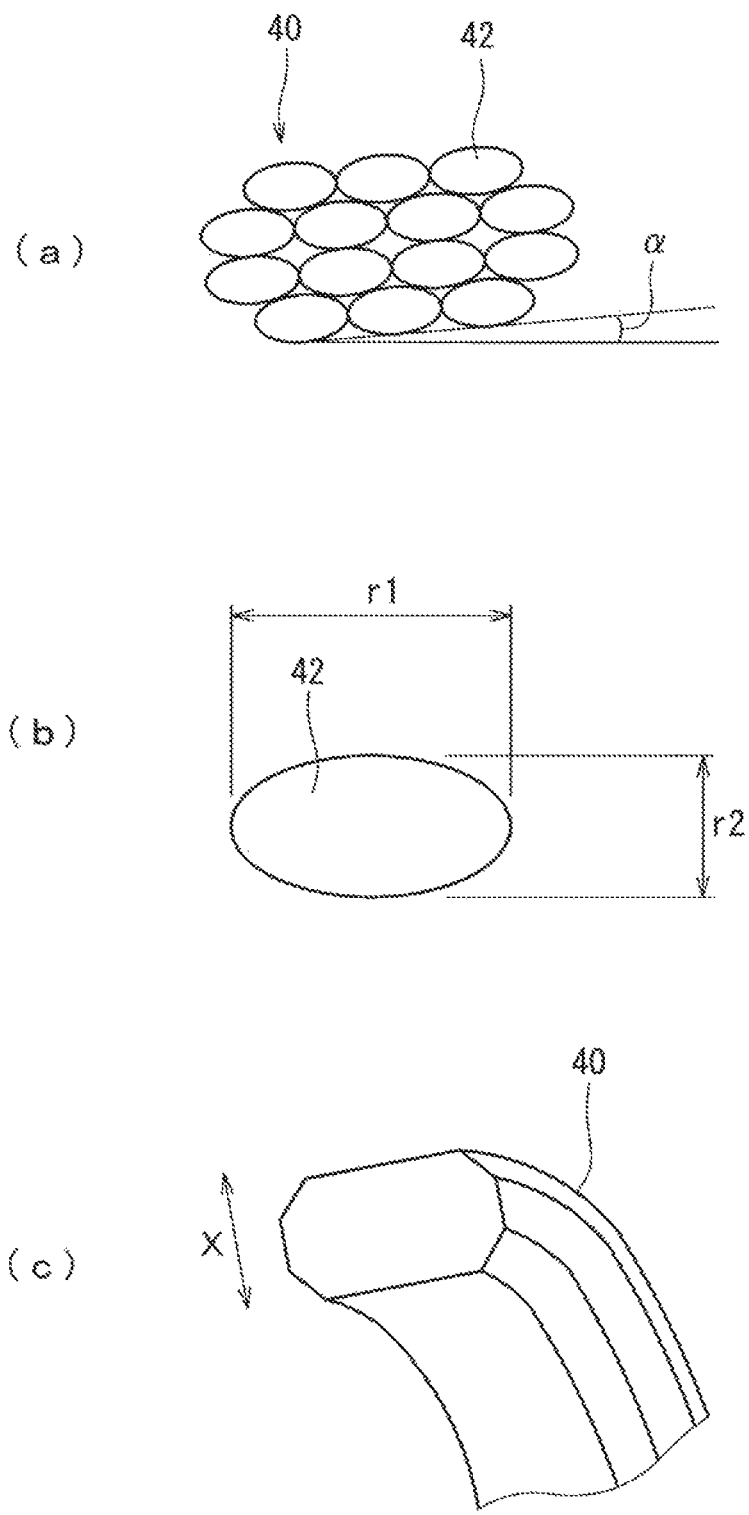

(a) of FIG. 5 is a schematic diagram showing an exemplary structure of wires in a core according to still another embodiment of the present invention, (b) of FIG. 5 is a cross-sectional view of the wire, and (c) of FIG. 5 is a schematic diagram of the core.

Figure 6:
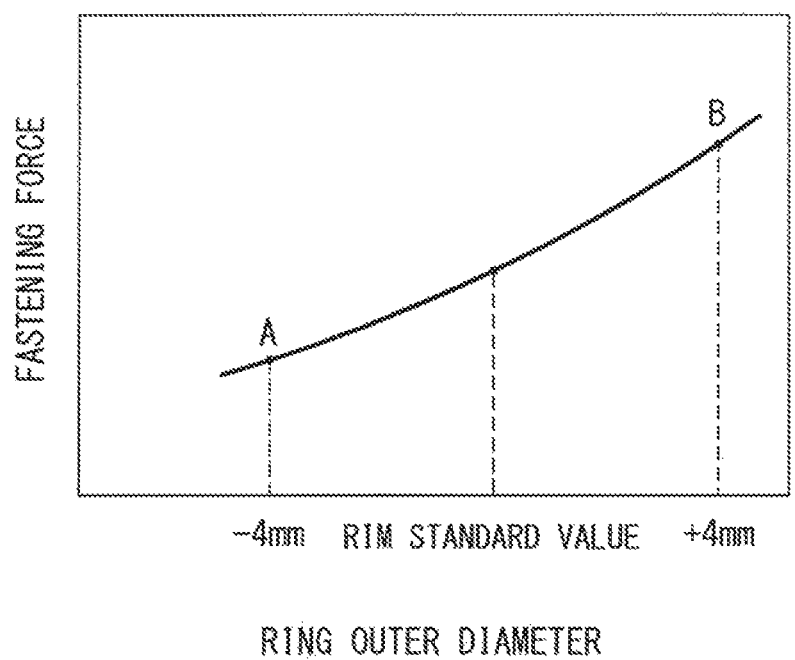

FIG. 6 shows an example of a measurement result obtained by a Hofmann fastening force test.

DESCRIPTION OF EMBODIMENTS

The following will describe in detail the present invention based on preferred embodiments with reference where appropriate to the accompanying drawings.

Figure 1:
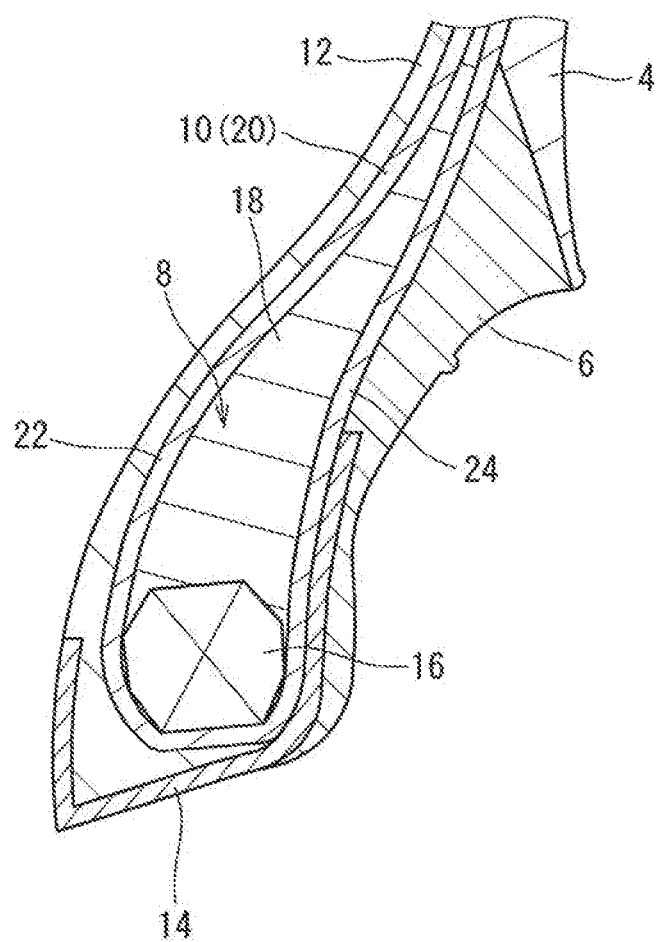
FIG. 1 is a cross-sectional view showing a part of a pneumatic tire according to an embodiment of the present invention.

FIG. 1 illustrates a part of a pneumatic tire 2. In FIG. 1, the up-down direction represents the radial direction of the tire 2, the right-left direction represents the axial direction of the tire 2, and the direction perpendicular to the drawing sheet represents the circumferential direction of the tire 2. Although not shown, the shape of the tire 2, excluding the tread pattern, is symmetric about the equator plane.

The tire 2 includes sidewalls 4, clinches 6, beads 8, a carcass 10, an inner liner 12, and chafers 14. Although not shown, the tire 2 further includes a tread, a belt, and a band in addition to the above components. The tire 2 is of the tubeless type. The tire 2 is mounted to a passenger car.

Although not shown, the tread has a shape which projects outward in the radial direction. The tread has a tread surface which comes into contact with the road surface. Grooves are formed in the tread surface. The grooves form a tread pattern. The tread has a base layer and a cap layer. The cap layer is disposed radially outward of the base layer. The cap layer is layered over the base layer. The base layer is formed of a crosslinked rubber which is excellent in adhesiveness. A typical base rubber for the base layer is natural rubber.

Each sidewall 4 extends from an end of the tread almost inward in the radial direction. The sidewall 4 is formed of a crosslinked rubber which is excellent in cut resistance and weather resistance. The sidewalls 4 prevent damage of the carcass 10.

The clinch 6 is disposed almost inward of the sidewall 4 in the radial direction. The clinch 6 is disposed axially outward of the bead 8 and the carcass 10. The clinch 6 is formed of a crosslinked rubber which is excellent in wear resistance. The clinch 6 comes into contact with a flange of a rim.

The beads 8 are disposed axially inward of the clinches 6. The beads 8 extend in the circumferential direction. Each bead 8 includes a core 16 and an apex 18 which extends radially outward from the core 16. The core 16 is ring-shaped. The apex 18 is tapered radially outward. The apex 18 is formed of a crosslinked rubber which has high hardness.

The carcass 10 includes a carcass ply 20. The carcass ply 20 is extended on and between the beads 8 on both sides, along the tread and the sidewalls 4. The carcass ply 20 is turned up around the core 16 from the inner side toward the outer side in the axial direction. By the turning-up of the carcass ply 20, the carcass ply 20 includes a main portion 22 and turned-up portions 24. The carcass 10 may include two or more carcass plies 20.

Although not shown, the carcass ply 20 includes multiple cords aligned with each other, and a topping rubber. The absolute value of an angle of each cord relative to the equator plane ranges from 75° to 90°. In other words, the carcass 10 forms a radial structure. The cords are formed of an organic fiber. Preferable examples of the organic fiber include polyester fibers, nylon fibers, rayon fibers, polyethylene naphthalate fibers, and aramid fibers.

Although not shown, the belt is disposed radially inward of the tread. The belt is layered over the carcass 10. The belt reinforces the carcass 10. The belt includes an inner layer and an outer layer. Although not shown, the inner layer and the outer layer each include multiple cords aligned with each other, and a topping rubber. Each cord is inclined relative to the equator plane. The absolute value of the inclination angle is typically greater than or equal to 10°, and not greater than 35°. The direction in which the cords of the inner layer are inclined relative to the equator plane is opposite to the direction in which the cords of the outer layer are inclined relative to the equator plane. A preferable material for the cords is steel. The cord may be formed using an organic fiber. The belt may include three or more layers.

Although not shown, the band is disposed radially inward of the tread. The band is disposed radially outward of the belt. The band is layered over the belt. The band includes a cord and a topping rubber. The cord is helically wound. The band has a so-called jointless structure. The cord extends substantially in the circumferential direction. An angle of the cord relative to the circumferential direction is less than or equal to 5°, and more preferably less than or equal to 2°. The band may contribute to the stiffness of the tire 2 in the radial direction. The band may reduce the influence of a centrifugal force acting during traveling. The tire 2 is excellent in high-speed stability. A preferable material for the cord is steel. The cord may be formed using an organic fiber. Preferable examples of the organic fiber include nylon fibers, polyester fibers, rayon fibers, polyethylene naphthalate fibers, and aramid fibers.

The belt and the band form a reinforcing layer. A reinforcing layer may be formed only by the belt. A reinforcing layer may be formed only by the band.

The inner liner 12 is disposed inward of the carcass 10. The inner liner 12 is joined to the inner surface of the carcass 10. The inner liner 12 is formed of a crosslinked rubber. The inner liner 12 is formed of a rubber which is excellent in airtightness. A typical base rubber for the inner liner 12 is isobutylene-isoprene-rubber or halogenated isobutylene-isoprene-rubber. The inner liner 12 maintains the internal pressure of the tire 2.

The chafer 14 is disposed near the bead 8. When the tire 2 is mounted on a rim, the chafer 14 is in contact with the rim. The bead 8 and portions near the bead 8 are protected due to the contact. In the tire 2, the chafer 14 is formed of a fabric and a rubber impregnated into the fabric. The chafer 14 may be formed integrally with the clinch 6.

In the present invention, the dimensions and angles of the components of the tire 2 are measured in a state where the tire 2 is mounted to a normal rim, and inflated with air to a normal internal pressure. During the measurement, no load is applied to the tire 2. In the description herein, the normal rim represents a rim that is specified according to the standards with which the tire 2 complies. The "standard rim" in the JATMA standards, the "design rim" in the TRA standards, and the "measuring rim" in the ETRTO standards, are included in the normal rim. In the description herein, the normal internal pressure represents an internal pressure that is specified according to the standards with which the tire 2 complies. The "maximum air pressure" in the JATMA standards, the "maximum value" recited in the "TIRE LOAD LIMITS AT VARIOUS COLD INFLATION PRESSURES" in the TRA standards, and the "inflation pressure" in the ETRTO standards, are included in the normal internal pressure. The dimensions and angles of a tire for a passenger car are measured at an internal pressure of 180 kPa.

Figure 2:
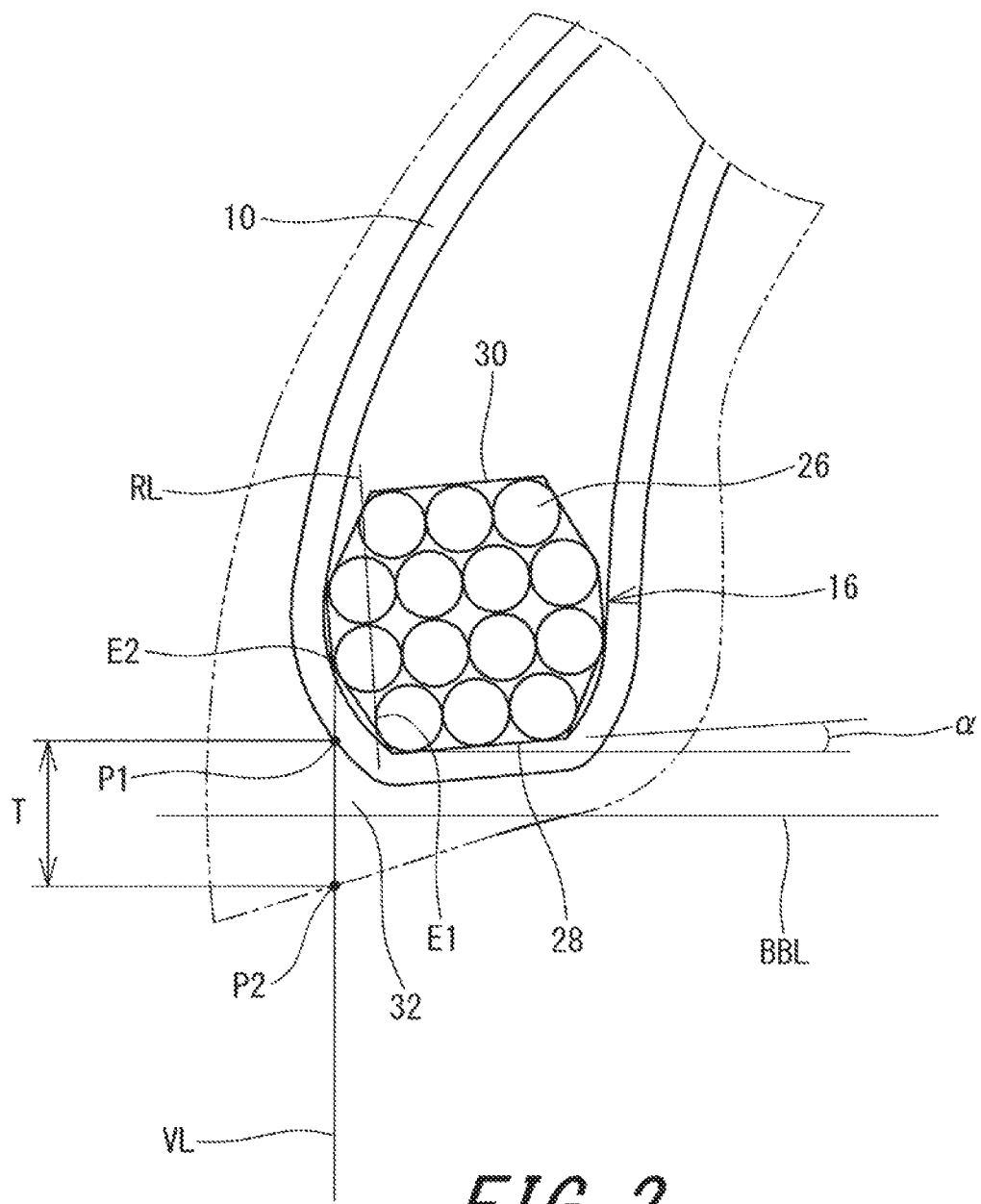
FIG. 2 is a schematic diagram showing a core portion of the tire in FIG. 1.

FIG. 2 shows a cross-section of the core 16 and the carcass 10 together with a contour of the bead 8 portion of the tire 2. The core 16 includes a non-stretchable wire which is wound in the circumferential direction. The core 16 may be formed by a single wire being wound. The core 16 may be formed by two or more wires being wound. A typical material for the wire is steel.

As shown in FIG. 2, in a cross-section taken at a plane perpendicular to the circumferential direction, a plurality of wire cross-sections 26 (wire cross-sectional surfaces 26) are aligned in the core 16. Each wire cross-section 26 has a circular shape. In the core 16, two or more rows of the wire cross-sections 26 aligned almost in the axial direction are stacked. In the core 16 in FIG. 2, four rows thereof are stacked. Of these rows, the radially innermost row is referred to as a first row, and the second row immediately outside the innermost row in the radial direction is referred to as a second row. As shown in FIG. 2, the number N1 of the wire cross-sections 26 in the first row is less than the number N2 of the wire cross-sections 26 in the second row. In the core 16 in FIG. 2, the number N1 is three, and the number N2 is four.

As described above, in the core 16, two or more rows of the wire cross-sections 26 aligned almost in the axial direction are stacked. In other words, each row extends almost in the axial direction. Of both ends of each row in the direction in which the row extends, the axially inner end is referred to as the "inner end of the row." In FIG. 2, an end E1 is the inner end of the first row, and an end E2 is the inner end of the second row. In FIG. 2, a straight line RL is a line which is drawn from the inner end E1 and is perpendicular to the direction in which the first row extends. This is referred to as the tangent RL of the first row. As shown in FIG. 2, in the core 16 of the tire 2, the inner end E2 of the second row is located axially inward of the tangent RL.

Here, the cross-section of the core 16 has an outer shape represented by a polygon surrounding all the wire cross-sections 26 aligned. Each side of the polygon is in contact with at least two of the wire cross-sections 26. In the core 16 in FIG. 2, the cross-section of the core 16 has an octagonal outer shape. Of the sides of the polygon, the radially innermost side is a bottom side 28 of the core 16.

In FIG. 2, a solid line BBL represents a bead base line. The bead base line corresponds to a line that defines the rim diameter of a rim on which the tire 2 is to be mounted (see JATMA). The bead base line BBL extends in the axial direction. As shown in FIG. 2, in the cross-section taken at a plane perpendicular to the circumferential direction of the core 16, the bottom side 28 of the core 16 is inclined relative to the bead base line BBL. The bottom side 28 is inclined relative to the bead base line BBL radially outward toward the outer side in the axial direction. An angle α represents an angle between the bottom side 28 of the core 16 and the bead base line BBL. In other words, the angle α represents an angle between: the direction in which the rows inside the core extend; and the bead base line BBL. In the tire 2, the angle α is greater than or equal to 2°, and not greater than 9°.

Of the wire cross-sections 26 in the second row, the radially innermost cross-section is referred to as the "reference cross-section." In FIG. 2, a straight line VL is a tangent that is drawn from the axially inner end of the reference cross-section and extends in the radial direction. A point P1 is an intersection point between the tangent VL and the radially inner surface of the carcass. A point P2 is an intersection point between the tangent VL and a surface of the bead 8 portion that comes into contact with the seat surface of a rim (referred to as the bottom of the bead 8 portion). A double-headed arrow T represents the distance between the intersection point P1 and the intersection point P2. A portion between the carcass 10 and the bottom of the bead 8 portion is referred to as a core inner portion 32. Therefore, in other words, the double-headed arrow T represents a thickness of the core inner portion 32 at the intersection point P1. In this tire 2, the thickness T of the core inner portion 32 at the intersection point P1 is greater than or equal to 3.1 mm, and not greater than 4.0 mm.

The axially inner end of the reference cross-section is a point different from the inner end E2 in the direction in which the second row extends. This is because the direction in which the second row extends is inclined by the angle α relative to the axial direction. In a tire having an angle α of 0°, the axially inner end of the reference cross-section coincides with the inner end E2 of the second row.

Advantageous effects of the present invention will be described below.

It is known that the rim diameter varies and deviates from the standard value due to error in production. If a bead is fitted onto a rim having a larger rim diameter than the standard value, the fastening force of the bead deviates from the appropriate value to a larger value. When a bead has a greater fastening force gradient, the deviation from the appropriate value is greater than the deviation in the case of a bead having a smaller fastening force gradient. This causes an increase in the fitting pressure. Time and effort are required to mount this tire onto a wheel having this rim. Meanwhile, when a bead is fitted onto a rim having a smaller rim diameter than the standard value, the fastening force of the bead deviates from the appropriate value to a smaller value. When a bead has a greater fastening force gradient, the deviation from the appropriate value is greater than the deviation in the case of a bead having a smaller fastening force gradient. This causes an insufficient rim fastening force of the bead. This may lead to rim slip or separation from rim.

As described above, in the tire 2 according, to the present invention, the number N1 of the wire cross-sections 26 in the first row is less than the number N2 of the wire cross-sections 26 in the second row. Further, the inner end E2 of the second row is located axially inward of the tangent RL drawn from the inner end E1 of the first row. This structure contributes a decrease in the fastening force gradient. Moreover, this structure improves the performance for preventing separation from rim. The bead 8 including the core 16 has improved performance for preventing separation from rim, and at the same time, the bead 8 has a smaller fastening force gradient.

As described above, in the tire 2 according to the present invention, the angle α between the bottom side 28 of the core 16 and the bead base line BBL is greater than or equal to 2°, and not greater than 9°. The core 16 in which the angle α is greater than or equal to 2°, and not greater than 9°, contributes a decrease in the fastening force gradient. Moreover, the bead 8 including the core 16 in which the angle α is greater than or equal to 2° allows reduction of fitting pressure. The bead 8 including the core 16 in which the angle α is not greater than 9° has the improved performance for preventing separation from rim. The bead 8 including the core 16 can have the improved performance for preventing separation from rim and allows reduction of fitting pressure, and at the same time, the bead 8 has a smaller fastening force gradient. In this viewpoint, the angle α is more preferably greater than or equal to 3°, and more preferably not greater than 8°.

As described above, in the tire 2 according to the present invention, the thickness T of the core inner portion 32 at the point P1 is greater than or equal to 3.1 mm. The fastening force, of the bead 8, which is generated when the bead 8 is fitted onto a rim larger than the standard value, is greater than the fastening force which is generated when the bead 8 is fitted onto a rim having the standard value. In this case, the core inner portion 32 having a thickness T greater than or equal to 3.1 mm can reduce an increase in the fastening force on the rim. The core inner portion 32 allows reduction of the deviation of the fastening force from the appropriate value. The fastening force, of the bead 8, which is generated when the bead 8 is fitted onto a rim smaller than the standard value, is smaller than the fastening force which is generated when the bead 8 is fitted onto a rim having the standard value. In this case, the core inner portion 32 having a thickness T greater than or equal to 3.1 mm can allows a decrease in the fastening force on the rim to be inhibited. The core inner portion 32 allows reduction of the deviation of the fastening force from the appropriate value. The core inner portion 32 contributes to a decrease in the fastening force gradient. In this viewpoint, the thickness T of the core inner portion 32 is more preferably greater than or equal to 3.2 mm.

As described above, in the tire 2 according to the present invention, the thickness T of the core inner portion 32 is not greater than 4.0 mm. The tire 2 in which the thickness T is not greater than 4.0 mm has a sufficient fastening force for a rim. This tire 2 allows prevention of rim slip and separation from rim. In this viewpoint, the thickness T is more preferably not greater than 3.6 mm.

In the tire 2 according to the present invention, when the structure in which the number N1 is less than the number N2, and the inner end E2 of the second row is located axially inward of the tangent RL, the structure in which the angle α is greater than or equal to 2°, and not greater than 9°, and the structure in which the thickness T is greater than or equal to 3.1 mm, and not greater than 4.0 mm, are combined, the fastening force gradient is more efficiently reduced. In this tire 2, even for a rim having a rim diameter that deviates from the standard value, rim slip and separation from rim can be prevented, and easy fitting can be assured.

In the core 16 in FIG. 2, the number of the wire cross-sections 26 aligned in the radially outermost row is three, and the number of the wire cross-sections 26 aligned in the row immediately inside the outermost row in the radial direction is four. Thus, in the core 16 in which three or more rows of the wire cross-sections 26 are stacked, the number of the cross-sections 26 aligned in the outermost row is preferably less than the number of the cross-sections 26 aligned in the row immediately inside the outermost row in the radial direction. This structure further reduces the fastening force gradient. The core 16 having this structure contributes to prevention of rim slip and separation from rim and assuring of easy fitting for a rim having a rim diameter that deviates from the standard value.

The cross-section of the core 16 preferably has an octagonal outer shape. In the core 16 in which the cross-section has an octagonal outer shape, the widths of the core 16 at the bottom side 28 and a side 30 (upper side 30) opposing the bottom side 28 are less than the width of the core 16 at a center portion between the bottom side 28 and the upper side 30. This outer shape of the cross-section of the core 16 contributes to a decrease in the fastening force gradient. The tire 2 having the bead 8 including this core 16 allows prevention of rim slip and separation from rim, and assuring of easy fitting, even for a rim having a rim diameter that deviates from the standard value.

The total Sw of the areas of the wire cross-sections 26 included in the cross-section of the core 16 is preferably greater than or equal to 13.6 mm$^2$, and not greater than 18.1 mm$^2$. The bead 8 including the core 16 in which the total area Sw is greater than or equal to 13.6 mm$^2$, and not greater than 18.1 mm$^2$, has a small fastening force gradient. The core 16 having this structure contributes to prevention of rim slip and separation from rim and assuring of easy fitting for a rim having a rim diameter that deviates from the standard value. Moreover, the core 16 in which the total area Sw is greater than or equal to 13.6 mm$^2$ contributes to improvement of the strength of the bead 8. Even when a heavy load is applied to the bead 8 during traveling or the like, damage to the bead 8 is prevented. The core 16 contributes to improvement of the durability of the tire 2.

The fastening force gradient is preferably less than or equal to 6000 N/mm. The tire 2 including the bead 8 in which the fastening force gradient is less than or equal to 6000 N/mm, prevents rim slip and separation from rim for a rim having a rim diameter that deviates from the standard value. This tire 2 allows easy fitting to be assured. In this viewpoint, the fastening force gradient is more preferably less than or equal to 5000 N/mm, and still more preferably less than or equal to 4000 N/mm.

Figure 3:
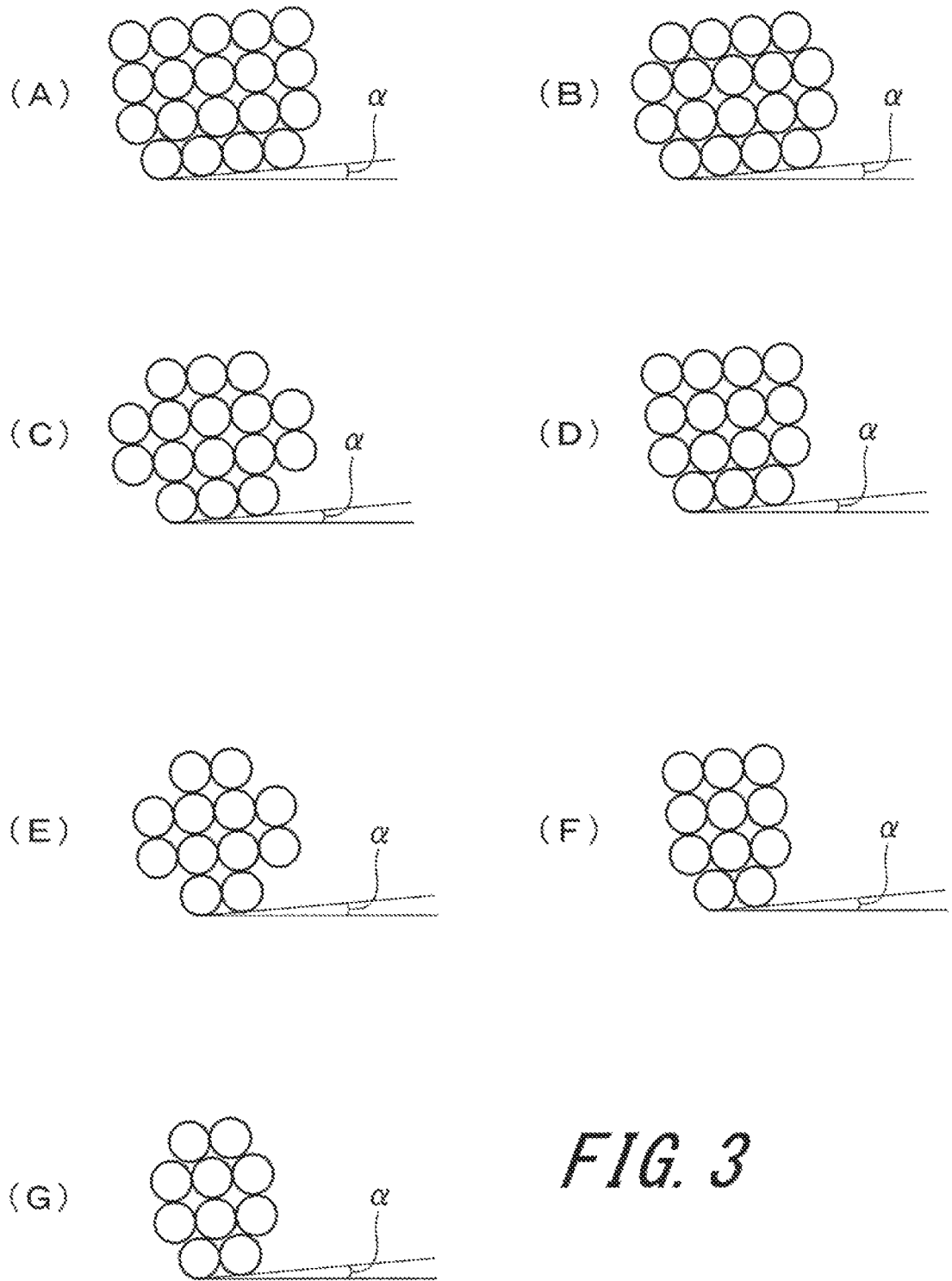
FIG. 3 is a schematic diagram showing an exemplary structure of wires in a core according to another embodiment of the present invention.

(A) to (G) of FIG. 3 show exemplary cross-sectional structures of cores according to other embodiments of the present invention. Tires including a core having any of these structures has a small fastening force gradient. These tires allow prevention of rim slip and separation from rim and assuring of easy fitting for a rim having a rim diameter that deviates from the standard value.

Figure 4:
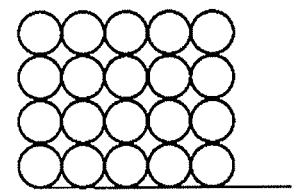
FIG. 4 is a schematic diagram showing an exemplary structure of wires in a core of a conventional tire.

FIG. 4 shows an exemplary core structure of a conventional tire for reference. This conventional core has a cross-section having a quadrangular outer shape. This core is not inclined relative to the bead base line. In this core, the number of cross-sections in the first row is the same as the number of cross-sections in the second row. In this core, the inner end of the second row is in contact with a tangent drawn from the inner end of the first row. In this core, the inner end of the second row is not located axially inward of the tangent drawn from the inner end of the first row. In this core, the thickness T of the core inner portion is measured using the axially innermost cross-section in the first row as the reference cross-section.

FIG. 5 is a diagram showing a cross-sectional structure of a core 40 according to still another embodiment of the present invention. As shown in (a) of FIG. 5, in the core 40, wire cross-sections 42 each have an elliptical shape elongated almost in the axial direction. The core 40 has a structure in which a plurality of rows of elliptical wire cross-sections 42 aligned almost in the axial direction are stacked. Therefore, the cross section of the core 40 also has an octagonal outer shape having a width increased almost in the axial direction.

As described above, the core 40 extends in the circumferential direction. The core 40 is ring-shaped. A part of the ring-shaped core 40 is shown in (c) of FIG. 5. The wire has a cross-sectional shape having a width increased almost in the axial direction. Therefore, this ring is more easily deformed in the radial direction (a direction indicated by an arrow X in (c) of FIG. 5) than the core having wires having the circular wire cross-sections. The ring of the core 40 may easily become eccentric. This facilitates fitting of this bead onto a rim. A tire having this bead is easily mounted onto a rim.

Meanwhile, after the bead having this core 40 is fitted on a rim, the core 40 has a ring shape which does not become eccentric. The fastening force of this bead is prevented from being different depending on the positions. This bead fastens a rim with an equal force at any position. The fastening force of the bead having this core 40 is not reduced, as compared to a bead that includes the core having a circular wire cross-section. This bead has a sufficient fastening force. This tire allows prevention of rim slip and separation from rim.

In (b) of FIG. 5, a double-headed arrow r1 represents the major axis of an ellipse, and a double-headed arrow r2 represents the minor axis of the ellipse. The flattening (r2/r1) of this ellipse is preferably less than or equal to 0.8. The core 40 including wires in which the flattening (r2/r1) is less than or equal to 0.8 can be easily deformed when the bead is fitted onto a rim. This bead is easily fitted onto a rim. The flattening (r2/r1) is preferably not less than 0.6. The core 40 including wires in which the flattening (r2/r1) is not less than 0.6 contributes to improvement of bead strength. Even when a heavy load is applied to the bead during traveling or the like, damage to the core 40 is prevented. This core 40 contributes to improvement of durability of the tire.

EXAMPLES

Hereinafter, advantageous effects of the present invention will become apparent according to examples. However, the present invention should not be restrictively construed based on the description of examples.

Example 1

A tire of example 1 having the configuration shown in FIG. 1 and the specifications indicated below in Table 1 was obtained. This tire had a size of 205/40R16. This tire had the core structure shown in FIG. 2. This is indicated as "FIG. 2" in the cell of the core structure in Table 1. The angle between the bottom side of the core and the bead base line BBL was 5°. This is indicated in the cell of the core angle α in Table 1.

Comparative Example 1

A tire of comparative example 1 was obtained in the same manner as for example 1 except that the core structure was as shown in FIG. 4 and the core angle α was 0°. This tire was a conventional tire. That the core structure was as shown in FIG. 4 is indicated by simply describing "FIG. 4" in the cell of the core structure in Table 1.

Comparative Example 2

A tire of comparative example 2 was obtained in the same manner as for example 1 except that the core structure was as shown in FIG. 4. This tire is the same as the tire of comparative example 1 except that the core angle α was 5°.

Comparative Example 3

A tire of comparative example 3 was obtained in the same manner as for example 1 except that the core structure was as shown in (A) of FIG. 3 and the core angle α was 0°. That the core structure was as shown in (A) of FIG. 3 is indicated by simply describing "(A) of FIG. 3" in the cell of the core structure in Table 1.

Example 2

A tire of example 2 was obtained in the same manner as for example 1 except that the core structure was as shown in (A) of FIG. 3.

Example 3

A tire of example 3 was obtained in the same manner as for example 1 except that the core structure was as shown in (B) of FIG. 3.

Comparative Examples 4 to 6 and Examples 4 to 5

Tires of comparative examples 4 to 6 and examples 4 to 5 were obtained in the same manner as for example 3 except that the core angle α was as indicated in Table 2.

Examples 6 to 10

Tires of examples 6 to 10 were obtained in the same manner as for example 1 except that the core structure was as indicated in Table 3.

Comparative Examples 7 to 8 and Examples 11 to 14

Tires of comparative examples 7 to 8 and examples 11 to 14 were obtained in the same manner as for example 1 except that the thickness T of the core inner portion was as indicated in Table 4.

[Fastening Force Gradient]

The fastening force gradient was measured using a method specified by Wdk116 (German Rubber Industry Association). The results are indicated below in Tables 1 to 4 and are represented by index numbers, where the value of comparative example 2 is 100. The less the numerical value is, the better the evaluation is.

[Fastening Force]

The fastening force was measured using a method specified by Wdk 116 (German Rubber Industry Association). The results are indicated below in Tables 1 to 4 and are represented by index numbers, where the value of comparative example 2 is 100. The greater the numerical value is, the better the evaluation is.

[Fitting Pressure]

A tire was mounted on a standard rim (size=16×7.5 JJ), and inflated with air. A pressure (fitting pressure) measured when the bead portion of the tire was moved over a hump of a rim, was obtained. The results are indicated below in Tables 1 to 4 and are represented by index numbers, where the value of comparative example 2 is 100. The less the numerical value is, the better the evaluation is.

[Performance for Preventing Separation from Rim]

A resistance force obtained when a bead was separated from a rim by applying a lateral load to the bead portion, was measured by bead unseating resistance force test in compliance with JIS D4230. The results are indicated below in Tables 1 to 4 and are represented by index numbers, where the value of comparative example 2 is 100. The greater the numerical value is, the better the evaluation is.

[Water Pressure Resistance]

A tire was mounted on a standard rim (size=16×7.5 JJ), a hole was made in the tire using a needle, and thereafter, water was injected into the tire through the pressure valve. Water was injected while letting air out through the pinhole, until the tire was broken. A water pressure at the break was measured. The results are indicated below in Tables 1 to 4 and are represented by index numbers, where the value of comparative example 2 is 100. The greater the numerical values is, the better the evaluation is.

[Tire Mass]

The mass of the tire was measured. The results are indicated below in Tables 1 to 4 and are represented by index numbers, where the value of comparative example 2 is 100. The less the numerical value is, the better the evaluation is.

[Rolling Resistance]

The rolling resistance was measured using a rolling resistance testing machine under the following measurement conditions.

Rim used: 16×7.5 JJ
Internal pressure: 250 kPa
Load: 3.82 kN
Speed: 80 km/h

The results are indicated below in Tables 1 to 4 and are represented by index numbers, where the value of comparative example 2 is 100. The less the numerical value is, the better the evaluation is.

TABLE 1

| | Evaluation results | | | | | |
|---|---|---|---|---|---|---|
| | Comparative example 1 | Comparative example 2 | Comparative example 3 | Example 2 | Example 3 | Example 1 |
| Core structure | FIG. 4 | FIG. 4 | (A) of FIG. 3 | (A) of FIG. 3 | (B) of FIG. 3 | FIG. 2 |
| Core angle α [°] | 0 | 5 | 0 | 5 | 5 | 5 |
| Total Sw [mm$^2$] | 22.6 | 22.6 | 21.5 | 21.5 | 20.4 | 15.8 |
| Thickness T [mm] | 3.0 | 2.5 | 4.2 | 3.8 | 3.8 | 3.4 |
| Flattening | 1.0 | 1.0 | 1.0 | 1.0 | 1.0 | 1.0 |
| Fastening force gradient | 108 | 100 | 103 | 95 | 93 | 90 |
| Fastening force | 92 | 100 | 94 | 102 | 104 | 110 |
| Fitting pressure | 108 | 100 | 106 | 98 | 96 | 90 |
| Performance for preventing separation from rim | 105 | 100 | 111 | 106 | 105 | 103 |
| Water pressure resistance | 100 | 100 | 99 | 99 | 98 | 95 |
| Mass | 100 | 100 | 100 | 100 | 99 | 98 |
| Rolling resistance | 100 | 100 | 100 | 100 | 100 | 99 |

TABLE 2

Evaluation results

| | Comparative example 4 | Example 4 | Example 5 | Comparative example 5 | Comparative example 6 |
|---|---|---|---|---|---|
| Core structure | (B) of FIG. 3 | (B) of FIG. 3 | (B) of FIG. 3 | (B) of FIG. 3 | (B) of FIG. 3 |
| Core angle α [°] | 1 | 2 | 9 | 10 | 15 |
| Total Sw [mm$^2$] | 20.4 | 20.4 | 20.4 | 20.4 | 20.4 |
| Thickness T [mm] | 4.1 | 4.0 | 3.4 | 3.3 | 2.8 |
| Flattening | 1.0 | 1.0 | 1.0 | 1.0 | 1.0 |
| Fastening force gradient | 98 | 95 | 95 | 98 | 113 |
| Fastening force | 99 | 101 | 106 | 107 | 109 |
| Fitting pressure | 101 | 99 | 94 | 93 | 91 |
| Performance for preventing separation from rim | 108 | 107 | 103 | 102 | 100 |
| Water pressure resistance | 98 | 98 | 98 | 98 | 98 |
| Mass | 99 | 99 | 99 | 99 | 99 |
| Rolling resistance | 100 | 100 | 100 | 100 | 100 |

TABLE 3

Evaluation results

| | Example 6 | Example 7 | Example 8 | Example 9 | Example 10 |
|---|---|---|---|---|---|
| Core structure | (C) of FIG. 3 | (D) of FIG. 3 | (E) of FIG. 3 | (F) of FIG. 3 | (G) of FIG. 3 |
| Core angle α [°] | 5 | 5 | 5 | 5 | 5 |
| Total Sw [mm$^2$] | 18.1 | 17.0 | 13.6 | 12.4 | 11.3 |
| Thickness T [mm] | 3.8 | 3.4 | 3.4 | 3.1 | 3.1 |
| Flattening | 1.0 | 1.0 | 1.0 | 1.0 | 1.0 |
| Fastening force gradient | 92 | 91 | 92 | 93 | 93 |
| Fastening force | 107 | 108 | 111 | 112 | 113 |
| Fitting pressure | 93 | 92 | 89 | 88 | 87 |
| Performance for preventing separation from rim | 104 | 103 | 101 | 100 | 98 |
| Water pressure resistance | 96 | 95 | 93 | 92 | 91 |
| Mass | 99 | 98 | 97 | 97 | 97 |
| Rolling resistance | 99 | 99 | 98 | 98 | 98 |

TABLE 4

Evaluation results

| | Comparative example 7 | Example 11 | Example 12 | Example 13 | Example 14 | Comparative example 8 |
|---|---|---|---|---|---|---|
| Core structure | FIG. 2 | FIG. 2 | FIG. 2 | FIG. 2 | FIG. 2 | FIG. 2 |
| Core angle α [°] | 5 | 5 | 5 | 5 | 5 | 5 |
| Total Sw [mm$^2$] | 15.8 | 15.8 | 15.8 | 15.8 | 15.8 | 15.8 |
| Thickness T [mm] | 3.0 | 3.1 | 3.2 | 3.6 | 4.0 | 4.1 |
| Flattening | 0.0 | 0.0 | 0.0 | 0.0 | 0.0 | 0.0 |
| Fastening force gradient | 96 | 92 | 91 | 93 | 95 | 98 |
| Fastening force | 113 | 112 | 111 | 107 | 104 | 102 |
| Fitting pressure | 87 | 88 | 89 | 93 | 94 | 97 |
| Performance for preventing separation from rim | 100 | 101 | 102 | 105 | 107 | 108 |
| Water pressure resistance | 95 | 95 | 95 | 95 | 95 | 95 |
| Mass | 98 | 98 | 98 | 98 | 98 | 98 |
| Rolling resistance | 99 | 99 | 99 | 99 | 99 | 99 |

As indicated in Tables 1 to 4, evaluation of the tires of the examples is higher than the evaluation of the tires of the comparative examples. The evaluation results clearly indicates that the present invention is superior.

INDUSTRIAL APPLICABILITY

The structures of the bead portions described above are applicable to various tires.

DESCRIPTION OF THE REFERENCE CHARACTERS

2 . . . tire
4 . . . sidewall
6 . . . clinch
8 . . . bead
10 . . . carcass
12 . . . inner liner
14 . . . chafer
16, 40 . . . core
18 . . . apex
20 . . . carcass ply
22 . . . main portion
24 . . . turned-up portion
26, 42 . . . wire cross-section
28 . . . bottom side
30 . . . upper side
32 . . . core inner portion

The invention claimed is:

1. A pneumatic tire comprising:
a tread having an outer surface that forms a tread surface;
a pair of sidewalls that extend inward from ends, respectively, of the tread in a radial direction;
a pair of beads disposed inward of the sidewalls, respectively, in the radial direction; and
a carcass that is extended on and between one of the beads and the other of the beads along inner sides of the tread and the sidewalls, wherein
each bead includes a core,
the core includes a non-stretchable wire wound in a circumferential direction,
in a cross-section of the core taken at a plane perpendicular to the circumferential direction, two or more rows of cross-sections of the wire aligned almost in an axial direction are stacked,
when, of the rows, a radially innermost row is a first row, and a row immediately outside the innermost row in the radial direction is a second row,
the number of cross-sections of the wire in the first row is less than the number of cross-sections of the wire in the second row,
an inner end of the second row is located axially inward of a line that is drawn from an inner end of the first row and that is perpendicular to a direction in which the first row extends,
in the cross-section of the core taken at a plane perpendicular to the circumferential direction, an angle between a bottom side of the core and a bead base line is greater than or equal to 2°, and not greater than 9°,
when, of the cross-sections of the wire in the second row, an axially innermost cross-section is a reference cross-section,
VL represents a tangent drawn from an axially inner end of the reference cross-section and extending in the radial direction,
P1 represents an intersection point between the tangent VL and a radially inner surface of the carcass, and
P2 represents an intersection point between the tangent VL and a bottom of a bead portion,
a distance T between the intersection point P1 and the intersection point P2 is greater than or equal to 3.1 mm, and not greater than 4.0 mm,
wherein the total of the areas of all the cross-sections of the wire included in the cross-section of the core is greater than or equal to 13.6 mm$^2$, and not greater than 18.1 mm$^2$.

2. The tire according to claim 1, wherein, in the cross-section of the core taken at a plane perpendicular to the circumferential direction, three or more of the rows are stacked, and, of the three or more rows, the number of cross-sections of the wire in a radially outermost row is less than the number of cross-sections of the wire in a row immediately inside the outermost row in the radial direction.

3. The tire according to claim 1, wherein the cross-section of the core has an octagonal outer shape.

4. The tire according to claim 1, wherein each cross-section of the wire is in the shape of an ellipse elongated in the row alignment direction.

5. The tire according to claim 4, wherein
when r1 represents a major axis of the ellipse, and r2 represents a minor axis of the ellipse,
a flattening (r2/r1) of the ellipse is greater than or equal to 0.6, and not greater than 0.8.

6. The tire according to claim 1, wherein the tire is a passenger car tire.

7. The tire according to claim 1, wherein the fastening force gradient of each bead of the tire is less than or equal to 6000 N/mm.

* * * * *